Patented Sept. 8, 1953

2,651,500

UNITED STATES PATENT OFFICE 2,651,500

ART OF DRILLING WELLS

Charles F. Teichmann, Mount Vernon, N. Y., assignor to Texaco Development Corporation, New York, N. Y., a corporation of Delaware No Drawing. Application May 4, 1948,
Serial No. 25,072

7 Claims. (Cl. 255—1.8)

This invention relates to the art of drilling and controlling wells such as oil wells, and more particularly to the control of the drilling fluids or so-called muds used in the drilling of such wells.

Drilling muds are used in the drilling of wells for tapping underground collections of oil, gas, brine or water. Such muds have different functions, the most important of which are to assist in the removing of cuttings from the well, to seal off formations of gas, oil, and water that may be encountered at different levels, to lubricate the drilling tool and the drill pipe which carries the tool, and to hold cuttings in suspension during shut-downs.

Drilling muds are essentially mixtures of finely divided solids such as clay, some of which is in colloidal form, and water, usually so compounded to weigh from 8 to 12 pounds per gallon. The mud is of such a character that it sets to some extent on the walls of the bore hole, even when drilling is in progress and the mud is being circulated, to seal the sides of the walls of the hole. The walls of the bore hole apparently function as a filter to collect the solid content of the mud on the hole surface while permitting the liquid to pass through. Such sealing is desirable when traversing formations that it is not desired to tap, but it is not desirable in traversing formations that should be tapped. However, up to the present, the sealing throughout the bore hole regardless of the types of formations traversed has been substantially uniform and incapable of selective control.

It is an object of this invention to provide a novel method of drilling whereby the degree of sealing of the mud at the different formations encountered in the drilling can be selectively controlled or the degree of sealing throughout the bore hole can be controlled.

Other objects and advantages of the invention will be apparent from the following description and appended claims.

In its broader aspect, the present invention involves the use of such materials in drilling muds as are capable of forming as solid constituents of the mud cake and are susceptible of metabolism or other attack by microorganisms and conversion to soluble self-removing products, and the inoculation of such drilling muds by microorganisms capable of effecting such metabolism. More specifically, the invention is concerned with the use in a drilling mud of different materials susceptible of such metabolism by selected microorganisms, and the subsequent inoculation of the drilling mud and the mud cake at a selected zone or zones with specific microorganisms capable of selectively metabolizing such materials, thereby rendering the zone or zones of the mud sealing the walls of the bore hole permeable. Preferably, the microorganisms, such as bacteria, are selected so that they will function to a material extent only in the presence of the material it is desired to secure, such as oil, and will function to only an insignificant extent in other formations traversed by the bore hole.

By way of example, the invention will be described in connection with the boring of an oil well. The sealing in such a well with conventional muds will be substantially uniform so that both desired and undesired underground deposits will be prevented from entering the bore hole to substantially equal degree. In insuring that only the preferred deposits permeate the mud cake, a certain amount of a substance capable of being metabolized by microorganisms is mixed with the mud, such material being homogeneously distributed as a solid throughout the mud cake on the walls of the bore hole. An organic material such as starch is suitable, although other materials having different rates of metabolism, such as casein, gelatin, gum tragacanth and the like can be used.

The well is then plugged below the zone in which it is desired to render the wall of the bore hole permeable. Such plugging may be accomplished by concrete, wood or by so-called retrievable plugs. Since the specific methods for accomplishing such plugging are well known in the art and form no part of the present invention, further explanation thereof is considered unnecessary. The well may also be plugged above the zone as by a wooden or retrievable plug to provide a closed zone or the top of the zone may be left open.

In a subsequent step microorganisms are charged to the zone in a suitable medium, the inoculated medium being introduced in the case of a closed zone, by an aperture or a pipe through the upper plug. The microorganisms can be charged directly to the zone in a suitable nutrient medium or in a medium such as the drilling mud used in the well, the latter preferably containing a microbiologically nutrient medium suitable for the microorganisms used. The compositions of such mediums differ with the various microorganisms and are well known to the art.

Microorganisms such as Clostridium amylobacter or its enzymes or an enzyme such as diastase are suitable for this purpose. Preferably, the microorganisms used are of a type that will function more rapidly in the presence of the desired material, such as petroleum.

The microorganisms are thus charged to the mud cake and function to metabolize the starch in the desired zone, thereby rendering the mud cake permeable so that any liquid in the rear of the cake can escape therethrough to the bore hole and eventually to the surface. The metabolism products of the starch are chiefly $CO_2$ and water and can be considered self-removing and soluble.

Instead of starch, cellulosic material such as cotton lint may be employed, in which case the mud is inoculated with a microorganism such as *Clostridium thermo-cellulodissolvens*.

Mixtures of organic materials can be used such as both starch and cellulosic materials. In such case, selectively functioning bacteria can be employed to selectively control the degree of permeability of the mud cake. This may be done with starch and cellulosic materials by inoculating the mud with *Clostridium amylobacter* which will metabolize starch but not cellulosic material. If it is desired to increase the permeability of the mud cake, the mud can be additionally inoculated with microorganisms capable of metabolizing the cellulosic material.

After the mud cake on the bore hole in the selected zone has been rendered permeable to the desired degree, the action of the microorganisms can be halted as by injecting a suitable bactericide or bringing the zone to a temperature sufficiently high to kill the bacteria as by steam. This step prevents the dissemination of the microorganisms throughout the well when the plugs are subsequently removed and drilling is resumed. Yet it does not prevent the process being practiced at other zones in the bore hole since the bactericide is quickly diluted by the drilling mud in subsequent drilling or it may be neutralized by appropriate chemicals. The killing of the bacteria by subjection to high temperatures obviously is only a temporary step and does not prevent repetition of the process in the bore hole.

If it is desired to treat the entire bore hole, the plugging is omitted in which case the microorganisms will function to render all the mud cake permeable. Again, it is preferred to ultilize microorganisms which become more active in the presence of the material for which the well is being drilled, such as petroleum.

Obviously, the method of the present invention is of great advantage in that it enables the permeability of the mud cake throughout the length of the bore hole or at any desired zone therein to be controlled. Moreover, such materials as are proposed do not affect the desired characteristics of the mud as regards viscosity and gelling rate to any marked degree.

It is to be understood that different materials aside from starch and cellulosic materials may be used in the drilling mud, the essential characteristics of such materials being their ability to form as solids in the mud cake, their ability to be metabolized or otherwise attacked by microorganisms and converted to relatively innocuous and substantially self-removing products such as $CO_2$ and water, and their relative compatibility with the drilling mud insofar as they will not substantially effect the thixotropy, viscosity or other critical characteristics thereof. Starch and cellulosic materials are preferred because of their relative low costs, ready availability, and generally superior characteristics.

The term "microorganisms" as used herein is intended to include bacteria, enzymes or other active products of bacteria as well as fungi.

Obviously many modifications and variations of the invention as above set forth may be made without departing from the spirit and scope thereof, and therefore only such limitations should be imposed as are indicated in the appended claims.

I claim:
1. In the art of drilling and controlling wells in which a drilling mud is circulated in the bore hole and a mud cake is formed on the walls thereof, the process comprising the steps of incorporating in the mud a material selected from the group consisting of carbohydrates and proteins, said material being capable of forming a solid constituent of said mud cake and of being metabolized by microorganisms to soluble products, forming a mud cake on the walls of the bore hole, subsequently inoculating the mud cake with bacteria of the Clostridium genus and effecting conversion of said material to soluble products by the action of said bacteria whereby said mud cake is rendered permeable while still retained on the walls of the bore hole.

2. A process according to claim 1 in which starch is incorporated in said drilling mud.

3. A process according to claim 1 in which cellulosic material is incorporated in said drilling mud.

4. A process according to claim 1 in which said mud cake is inoculated with *Clostridium amylobacter*.

5. A process according to claim 1 in which said mud cake is inoculated with *Clostridium thermo-cellulodissolvens*.

6. In the art of drilling and controlling wells in which a drilling mud is circulated in the bore hole and a mud cake is formed on the walls thereof, the process comprising the steps of incorporating in the mud a material selected from the group consisting of carbohydrates and proteins, said material being capable of forming a solid constituent of said mud cake and of being metabolized by microorganisms to soluble products, forming a mud cake on the walls of the bore hole, plugging said bore hole to define a selected zone therein, subsequently inoculating the mud cake in said zone with bacteria of the Clostridium genus and effecting conversion of said material to soluble products whereby the mud cake within said selected zone is rendered permeable while retained in position on the walls of the bore hole.

7. In the art of drilling and controlling wells in which a drilling mud is circulated in the bore hole and a mud cake is formed on the walls thereof, the process comprising the steps of incorporating in the mud a material selected from the group consisting of carbohydrates and proteins, said material being capable of forming a solid constituent of said mud cake and of being metabolized by microorganisms to soluble products, forming a mud cake on the walls of the bore hole, plugging said bore hole to define a selected zone therein, subsequently inoculating the mud cake in said zone with bacteria of the Clostridium genus, effecting conversion of said material to soluble products whereby the mud cake within said selected zone is rendered permeable while retained in position on the walls of the bore hole, halting the action of said bacteria, removing the plugging defining said zone and resuming drilling.

CHARLES F. TEICHMANN.

References Cited in the file of this patent

UNITED STATES PATENTS

| Number | Name | Date |
| --- | --- | --- |
| 1,998,756 | Grebe et al. | Apr. 23, 1935 |
| 2,259,419 | Hefley et al. | Oct. 14, 1941 |